US008237369B2

(12) United States Patent
Chang

(10) Patent No.: US 8,237,369 B2
(45) Date of Patent: Aug. 7, 2012

(54) LIGHT SOURCE APPARATUS AND DRIVING CIRCUIT THEREOF

(75) Inventor: Tsung-Hau Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 448 days.

(21) Appl. No.: 12/401,624

(22) Filed: Mar. 11, 2009

(65) Prior Publication Data

US 2010/0156316 A1 Jun. 24, 2010

(30) Foreign Application Priority Data

Dec. 24, 2008 (TW) ................................ 97150531 A

(51) Int. Cl.
*H05B 39/02* (2006.01)
(52) U.S. Cl. ..................... 315/209 R; 315/226; 315/291
(58) Field of Classification Search .............. 315/209 R, 315/185 R, 186, 193, 210, 224, 225, 226, 315/291, 294, 297, 306, 307, 308, 312, 362
See application file for complete search history.

(56) References Cited

U.S. PATENT DOCUMENTS 7,825,604 B2 * 11/2010 Chida ....................... 315/209 R

* cited by examiner

*Primary Examiner* — Douglas W Owens
*Assistant Examiner* — Jianzi Chen
(74) *Attorney, Agent, or Firm* — Jianq Chyun IP Office

(57) ABSTRACT

A light source apparatus and a light source driving circuit are provided. The light source driving circuit includes an operation amplifier (OP-AMP), a transistor, and a switch unit. A first input terminal and an output terminal of the OP-AMP couple to a predetermined voltage and a control terminal of the transistor, respectively. A first terminal of the transistor couples to a light source. The switch unit includes a first signal terminal receiving a first voltage greater than a predetermined voltage, a second signal terminal coupled to a second input terminal of the OP-AMP, a third signal terminal coupled to a second terminal of the transistor, and an enabling terminal receiving a driving voltage. A voltage of the third signal terminal or a voltage of the first signal terminal is determined to transmit to the second signal terminal in accordance with the driving voltage.

34 Claims, 7 Drawing Sheets

LIGHT SOURCE APPARATUS AND DRIVING CIRCUIT THEREOF

CROSS-REFERENCE TO RELATED APPLICATION

This application claims the priority benefit of Taiwan application serial no. 97150531, filed on Dec. 24, 2008. The entirety of the above-mentioned patent application is hereby incorporated by reference herein and made a part of specification.

BACKGROUND OF THE INVENTION

1. Field of the Invention

The present invention generally relates to a driving circuit, and more particularly, to a light source apparatus and a driving circuit thereof, adapted for achieving a driving current which increases and decreases with a same speed.

2. Description of Related Art

Nowadays, because of the progresses made in the optoelectronic field, light emitting diodes (LEDs) having the advantages of lower cost and convenience in operation are more widely applied. For example, single color LEDs are often used for traffic signs, handheld illumination devices, and instrument lights, while multi-color LEDs are more often used in advertising boards and ultra large displays.

With respect to a display, in order to turn on/off a driving current of a conventional driving circuit of LED, it is often required to change the input reference voltage of the operation amplifier (OP-AMP) or power off the OP-AMP. In this case, the operation current of an inner chip drastically varies.

FIG. 1 is a schematic diagram illustrating a circuit of a conventional light source apparatus. Referring to FIG. 1, in a light source apparatus 100, an LED series $D_1$ through $D_n$ is coupled between a system voltage Vdd and a drain of a transistor M1. A current I is a driving current for the LED series $D_1$ through $D_n$. According to the electric characteristic of the OP-AMP 101 (i.e., when only one terminal is inputted with a voltage, the voltage at the positive input terminal is equal to the voltage at the negative input terminal), the current value of the driving current I is Vin/R (i.e., the voltage value of the driving voltage Vin divided by the resistance value of the resistor R). Therefore, the amount of the driving current I can be determined by the driving voltage Vin. In other words, the driving current I can be turned off or turned on by adjusting the driving voltage Vin. Further, the driving current I can also be turned off by powering off the OP-AMP 101 for lowering the gate voltage of the transistor M1 to a low voltage level. However, all approaches discussed above for turning off the driving current I cause drastic variation of the operation current of the inner chip. Further, when turning off the driving current I by adjusting the driving voltage Vin, it is required to precisely control the voltage Vin outputted from the previous stage (i.e., light source controller 102). Otherwise, the driving current I will increase and decrease with different speeds.

SUMMARY OF THE INVENTION

Accordingly, the present invention is directed to provide a light source apparatus, adapted for reducing a variation amplitude of an operation current of an inner chip.

The present invention is further directed to provide a light source driving circuit, adapted for achieving a driving current which increases and decreases with a same speed.

The present invention provides a light source driving circuit. The light source driving circuit includes an OP-AMP, a transistor, a switch unit, and a first resistor. The OP-AMP includes a first input terminal, a second input terminal, and an output terminal. The first input terminal of the OP-AMP is coupled to a predetermined voltage. The transistor includes a first terminal, a second terminal, and a control terminal. The first terminal of the transistor is coupled to a light source. The control terminal of the transistor is coupled to the output terminal of the OP-AMP. The switch unit includes a first signal terminal, a second signal terminal, a third signal terminal, and an enabling terminal. The first signal terminal receives a first voltage greater than the predetermined voltage. The second signal terminal is coupled to the second input terminal of the OP-AMP. The third signal terminal is coupled to the second terminal of the transistor. The enabling terminal receives a driving voltage. When the driving voltage is enabled, the switch unit transmits a voltage of the third signal terminal to the second signal terminal. When the driving voltage is disabled, the switch unit transmits a voltage of the first signal terminal to the second signal terminal. The first resistor is coupled between the second terminal of the transistor and a second voltage.

The present invention further provides a light source apparatus including a light source and a light source driving circuit. The light source includes a first terminal coupled to a third voltage, and a second terminal. The light source driving circuit includes an OP-AMP, a transistor, a switch unit, and a first resistor. The OP-AMP includes a first input terminal, a second input terminal, and an output terminal. The first input terminal of the OP-AMP is coupled to a predetermined voltage. The transistor includes a first terminal, a second terminal, and a control terminal. The first terminal of the transistor is coupled to the second terminal of the light source. The control terminal of the transistor is coupled to the output terminal of the OP-AMP. The switch unit includes a first signal terminal, a second signal terminal, a third signal terminal, and an enabling terminal. The first signal terminal receives a first voltage greater than the predetermined voltage. The second signal terminal is coupled to the second input terminal of the OP-AMP. The third signal terminal is coupled to the second terminal of the transistor. The enabling terminal receives a driving voltage. When the driving voltage is enabled, the switch unit transmits a voltage of the third signal terminal to the second signal terminal. When the driving voltage is disabled, the switch unit transmits a voltage of the first signal terminal to the second signal terminal. The first resistor is coupled between the second terminal of the transistor and a second voltage.

As discussed above, the light source apparatus and the driving circuit thereof employs switch unit to switch voltages between different signal terminals according to a variation of the driving voltage. In such a way, the circuit operation function of the OP-AMP can be switched between a comparator and a voltage follower. Further, when the OP-AMP serves as a comparator, the voltage outputted therefrom turns off the transistor, and when the OP-AMP serves a voltage follower, the voltage outputted therefrom turns on the transistor for driving the light source. As such, the variation amplitude of the operation current of the inside chip can be reduced. Meanwhile, because of the stable electric characteristic of the OP-AMP, the driving current of the light source increases and decreases with a same speed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
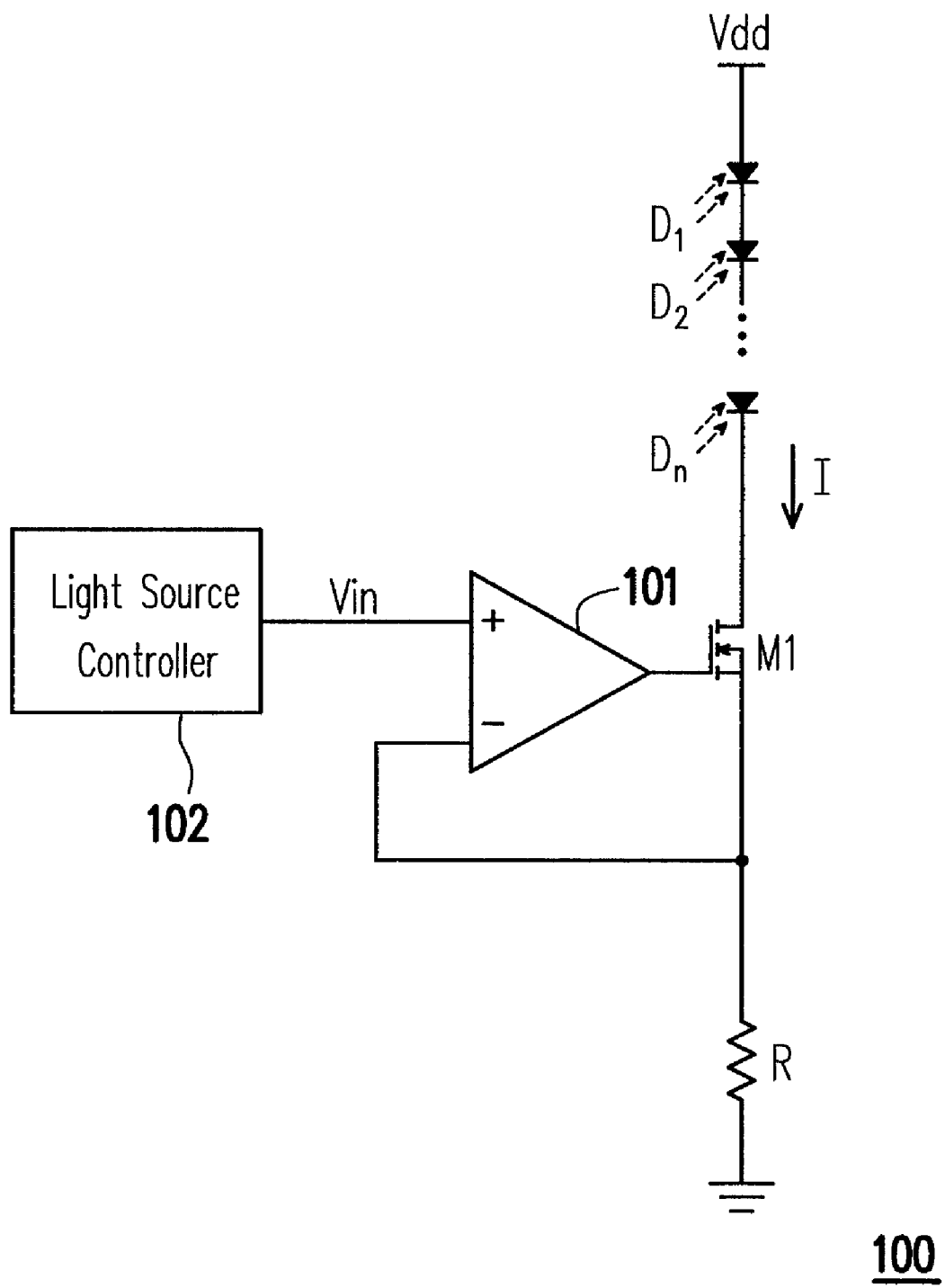
FIG. 1 is a schematic diagram illustrating a circuit of a conventional light source apparatus.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
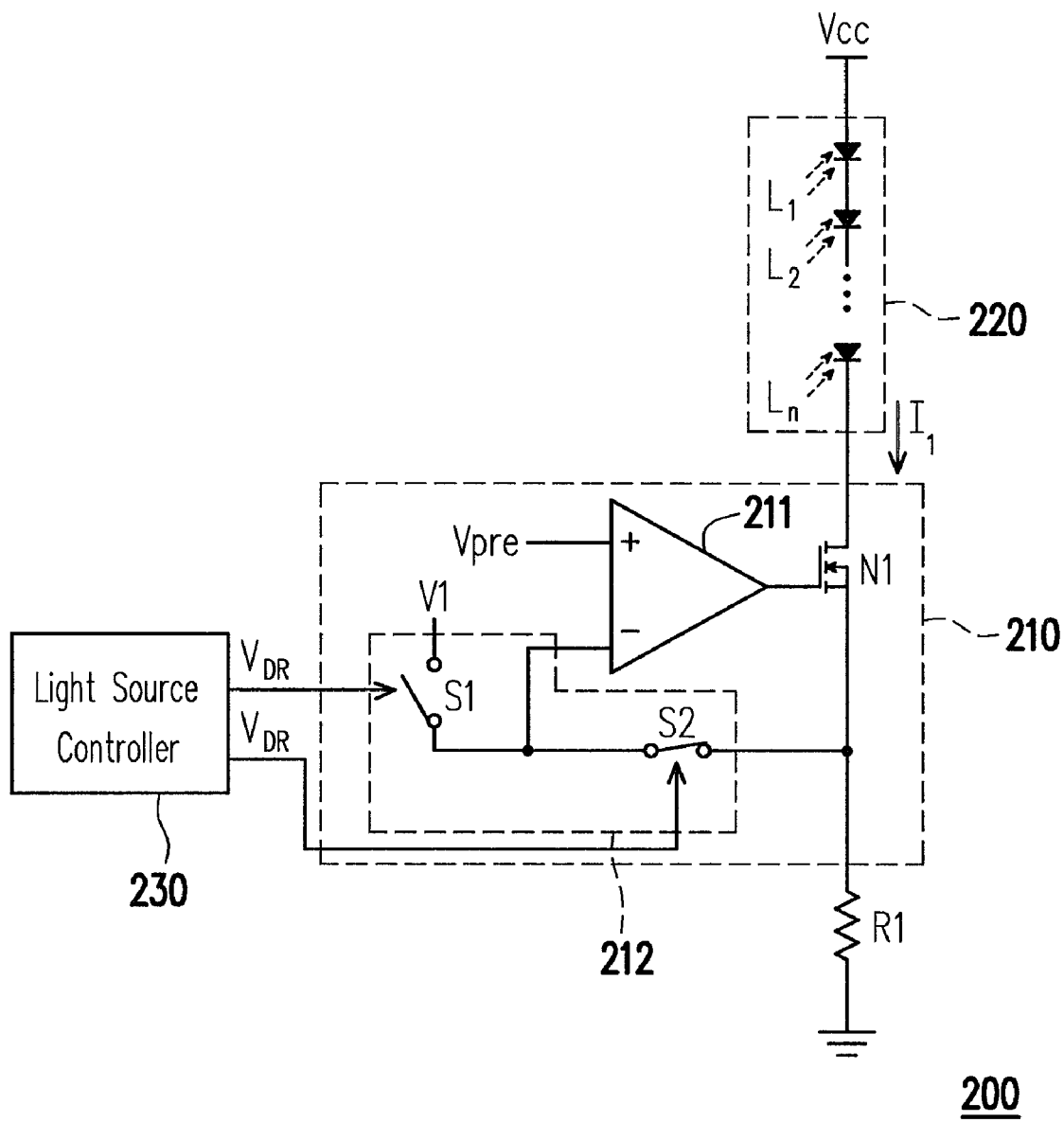
FIG. 2 is a schematic diagram illustrating a circuit of a light source apparatus according to a first embodiment of the present invention.

FIG. 2 is a schematic diagram illustrating a circuit of a light source apparatus 200 according to a first embodiment of the present invention. Referring to FIG. 2, a light source apparatus 200 is shown in the current embodiment. The light source apparatus 200 includes a driving circuit 210, a light source 220, and a light source controller 230. The light source 220 is exemplified with an LED series $L_1$ through $L_n$ for example. The light source 220 is coupled between a third voltage (e.g., a system voltage Vcc) and a driving circuit 210. The driving circuit 210 is coupled to the light source controller 230 for receiving a driving voltage $V_{DR}$. The driving circuit 210 includes an OP-AMP 211, a switch unit 212, a transistor N1, and a first resistor R1. In the current embodiment, the transistor N1 is for example an N-channel metal oxide semiconductor (NMOS) transistor. The switch unit 212 includes a first switch S1 and a second switch S2.

The OP-AMP 211 includes a first input terminal (e.g., positive input terminal), a second input terminal (e.g., negative input terminal), and an output terminal. The positive input terminal of the OP-AMP 211 receives a predetermined voltage Vpre. The negative input terminal of the OP-AMP 211 is coupled to a second terminal of the first witch S1. The output terminal of the OP-AMP 211 is coupled to a control terminal (e.g., gate terminal) of the transistor N1. The first switch S1 includes a first terminal coupled to a first voltage V1. The first voltage V1 is greater than the predetermined voltage Vpre. Both of the first voltage V1 and the predetermined voltage Vpre are constant voltages. The second switch S2 includes a first terminal coupled to the second terminal of the first switch S1. A second terminal of the second switch S2 is coupled to a second terminal (e.g., source terminal) of the transistor N1. A first terminal (e.g., drain terminal) of the transistor N1 is coupled to a second terminal of the light source 220. The first resistor R1 is coupled between the source terminal of the transistor N1 and a second voltage (e.g., grounding voltage).

In the current embodiment, the switches S1 and S2 are driven by the driving voltage $V_{DR}$. When the driving voltage $V_{DR}$ is enabled (e.g., at a logic high voltage level), the first switch S1 is turned off and the second switch S2 is turned on. In this case, the OP-AMP 211 is operated serving as a voltage follower. Meanwhile, the voltage at the gate terminal of the transistor N1 is pulled up by the voltage of the output terminal of the OP-AMP 211, so that the transistor N1 is turned on for conducting. Upon the operation of the circuit, the voltage drop over the first resistor R1 is equal to the voltage value of the predetermined voltage Vpre, and is transmitted to the negative input terminal of the OP-AMP 211. Meanwhile, because the transistor N1 is turned on, the driving circuit 210 provides a driving current $I_1$ to the light source 220. The driving current $I_1$ is approximately equal to the voltage value of the predetermined voltage Vpre divided by the resistance value of the first resistor R1.

When the driving voltage $V_{DR}$ is disabled (e.g., at a logic low voltage level), the first switch S1 is turned on and the second switch S2 is turned off, so that the first voltage V1 is transmitted to the negative input terminal of the OP-AMP 211. In this case, the OP-AMP 211 is operated serving as a comparator. Meanwhile, because the first voltage V1 is greater than the predetermined voltage Vpre, the voltage at the negative input terminal is higher than the voltage at the positive input terminal. As such, the negative voltage difference between the positive input terminal and the negative input terminal (where the voltage at the negative terminal is higher than the voltage at the positive input terminal) will be amplified. Therefore, the output terminal of the OP-AMP 211 outputs a low voltage level (e.g., a grounding voltage), so that the transistor N1 is turned off, thus the driving current $I_1$ is turned off.

The brightness of the light source 220 can be adjusted in accordance with the pulse width modulation (PWM) technology, or by modulating the pulse width of the driving voltage $V_{DR}$ (controlling the driving current $I_1$). All of the foregoing control approaches are complied with the circuit of the OP-AMP 211. In an open loop, the slew rate of the output of the OP-AMP 211 is related to the tail current of the input terminal thereof. As such, no matter the output increase or decreases, the slew rate remains unchanged. Therefore, the driving current $I_1$ increases and decreases with a same speed. Further, the accuracy for the voltage level of the driving voltage of the foregoing approaches is not required as the conventional. In other words, a chip of a lower grade can be used for the previous stage (i.e., the light source controller 230), and therefore the cost spent on the forestage can be saved.

Second Embodiment

Figure 3:
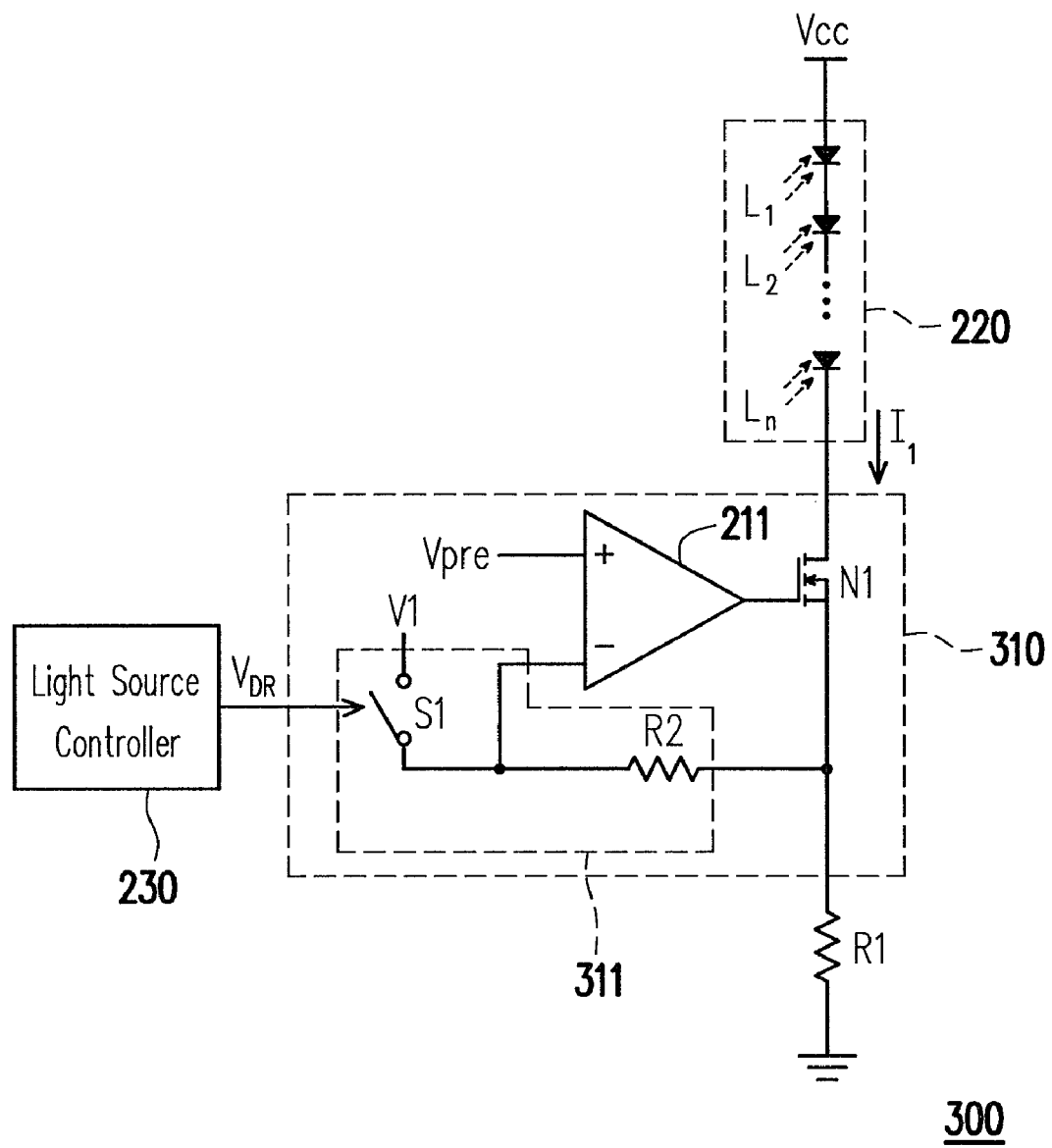
FIG. 3 is a schematic diagram illustrating a circuit of a light source apparatus according to a second embodiment of the present invention.

FIG. 3 is a schematic diagram illustrating a circuit of a light source apparatus 300 according to a second embodiment of the present invention. Comparing FIG. 3 with FIG. 2, it can be learnt that the main difference between FIG. 2 and FIG. 3 is the switch unit 311 of the driving circuit 310. In the switch unit 311, a second resistor R2 is employed for substituting the second switch S2. The second resistor R2 has a resistance value greater than a resistance value of the first switch S1 when the first switch S1 is turned on. When the driving voltage $V_{DR}$ is enabled, the first switch S1 is turned off. In this case, upon the operation of the circuit, the voltage drop over the second resistor R2 is approximately zero (i.e., the second resistor R2 can be considered as a short circuit) because the current of the negative input terminal of the OP-AMP 211 is approximately zero. Therefore, a voltage drop over the first resistor R1 is approximately equal to the voltage value of the predetermined voltage Vpre. As such, the circuit of the OP-AMP 211 is operated as a voltage follower.

Moreover, the voltage at the gate terminal of the transistor N1 is pulled up by the voltage of the output terminal of the OP-AMP 211, so as to conduct the transistor N1, thus providing the driving current $I_1$ to the light source 220. The driving current $I_1$ is approximately equal to the voltage value of the predetermined voltage Vpre divided by the resistance value of the first resistor R1. When the driving voltage $V_{DR}$ is disabled, the first switch S1 is turned on. The resistance value of the second resistor R2 is much greater than the resistance value of the first switch S1 when the first switch S1 is turned on. Therefore, the conducted first switch S1 almost causes no voltage drop. As such, the first voltage V1 is transmitted to the negative input terminal of the OP-AMP 211 (i.e., the second resistor R2 can be considered as an open circuit). Meanwhile, the voltage of the negative input terminal of the OP-AMP 211 is approximately equal to the first voltage V1, so that the OP-AMP 211 configures an open loop. The negative voltage difference between the positive input terminal and the negative input terminal is amplified. Therefore, the output terminal of the OP-AMP 211 outputs a low voltage level, so that the transistor N1 is turned off, thus the driving current $I_1$ is turned off.

Third Embodiment

Figure 4:
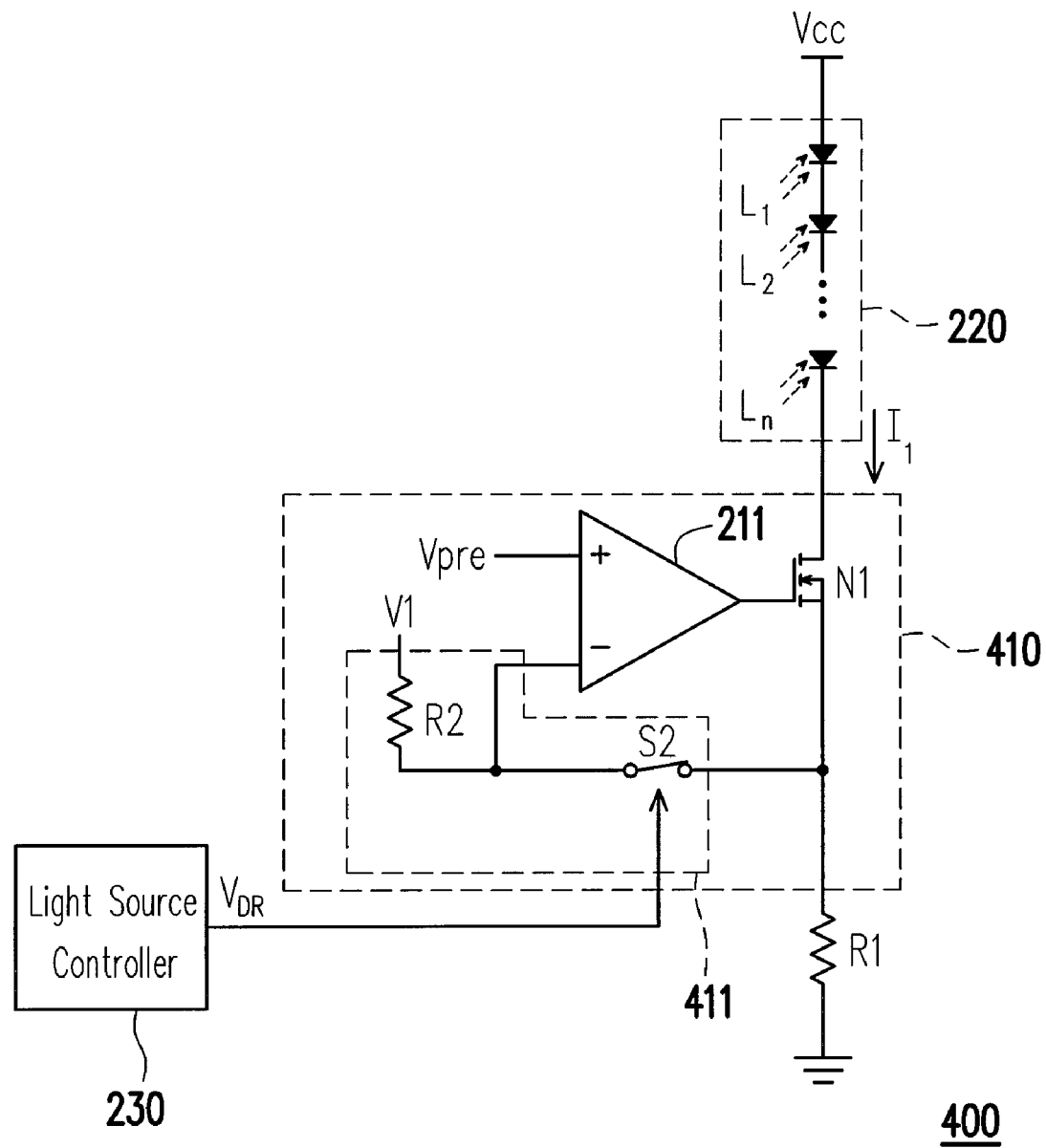
FIG. 4 is a schematic diagram illustrating a circuit of a light source apparatus according to a third embodiment of the present invention.

FIG. 4 is a schematic diagram illustrating a circuit of a light source apparatus 400 according to a third embodiment of the present invention. Comparing FIG. 4 with FIG. 2, it can be learnt that the main difference between FIG. 2 and FIG. 4 is the switch unit 411 of the driving circuit 410. In the switch unit 411, a second resistor R2 is employed for substituting the first switch S1. The second resistor R2 has a resistance value greater than a resistance value of the second switch S2 when the second switch S2 is turned on. When the driving voltage $V_{DR}$ is enabled, the second switch S2 is turned on. In this case, upon the operation of the circuit, the OP-AMP 211 causes a voltage drop over the first resistor R1 to be equal to the voltage value of the predetermined voltage Vpre, in which the voltage at the negative input terminal of the OP-AMP is equal to the predetermined voltage Vpre. Further, the resistance value of the second resistor R2 is much greater than the resistance value of the second switch S2 when the second switch S2 is turned on, and the voltage difference between the first voltage V1 and the predetermined voltage Vpre is absorbed by the second resistor R2 (i.e., the second resistor can be considered as an open circuit), so that the circuit of the OP-AMP 211 is operated as a voltage follower, in which the driving current $I_1$ is approximately equal to the predetermined voltage Vpre divided by the resistance value of the first resistor R1.

When the driving voltage $V_{DR}$ is disabled, the second switch S2 is turned off. In this case, there is no current generated at the negative input terminal, so that there is no voltage drop caused over the second resistor R2 (i.e., the second resistor R2 can be considered as a short circuit). As such, the first voltage V1 is transmitted to the negative input terminal of the OP-AMP 211. Meanwhile, the OP-AMP 211 is operated as a comparator, while the voltage of the negative input terminal is higher than the positive input terminal. Therefore, the output terminal of the OP-AMP 211 outputs a low voltage level, so that the transistor N1 is turned off, thus the driving current $I_1$ is turned off.

Fourth Embodiment

Figure 5:
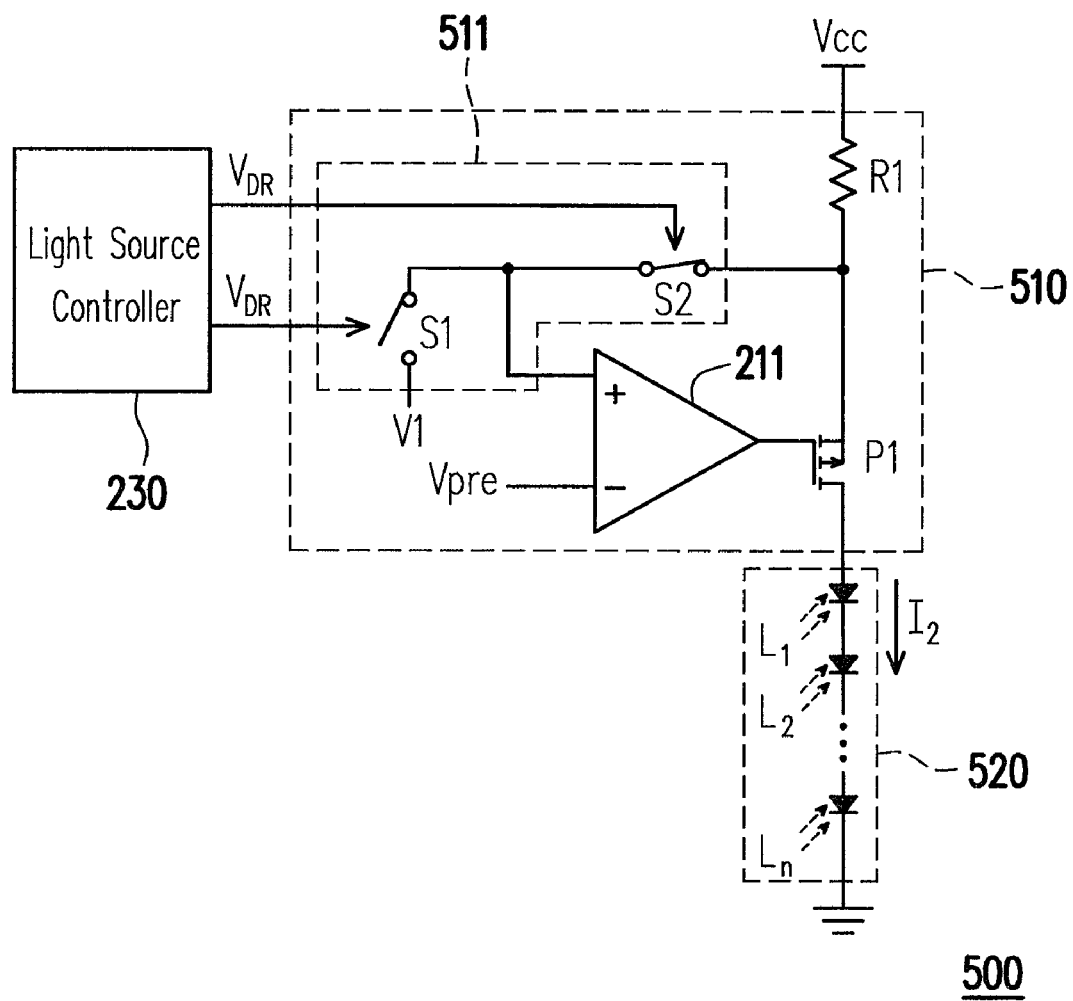
FIG. 5 is a schematic diagram illustrating a circuit of a light source apparatus according to a fourth embodiment of the present invention.

FIG. 5 is a schematic diagram illustrating a circuit of a light source apparatus 500 according to a fourth embodiment of the present invention. Referring to FIG. 5, a light source apparatus 500 is illustrated in the current embodiment. The light source apparatus 500 includes a driving circuit 510, a light source 520, and a light source controller 230. In the current embodiment, the same reference numbers are used in FIG. 5 for referring to the same or like parts shown in FIG. 2. The light source 520 is coupled between a grounding voltage (i.e., third voltage) and the driving circuit 510. Similarly, the light source 520 is exemplified with an LED series $L_1$ through $L_n$ for example. The driving circuit 510 is coupled to the light source controller 230 for receiving the driving voltage $V_{DR}$. The driving circuit 510 includes an OP-AMP 211, a switch unit 511, a transistor P1, and a resistor R1. In the current embodiment, the transistor P1 is for example a P-channel metal oxide semiconductor (PMOS) transistor. The switch unit 511 includes switches S1 and S2.

The OP-AMP 211 includes a first input terminal (e.g., negative input terminal), a second input terminal (e.g., positive input terminal), and an output terminal. The negative input terminal of the OP-AMP 211 receives a predetermined voltage Vpre. The positive input terminal is coupled to a second terminal of the switch S1. The output terminal of the OP-AMP 211 is coupled to a control terminal (e.g., gate terminal) of the transistor P1. A first terminal of the switch S1 is coupled to the first voltage V1. A first terminal of the switch S2 is coupled to a second terminal of the switch S1. A second terminal of the switch S2 is coupled to the second terminal (e.g., source terminal) of the transistor P1. A first terminal (e.g., drain terminal) of the transistor P1 is coupled to the light source 520. The resistor R1 is coupled between the source terminal of the transistor P1 and a second voltage Vcc (e.g., system voltage).

The switch unit 511 is operated in a manner similar to the switch unit 211 of the embodiment of FIG. 2, and is not to be iterated hereby. When the driving voltage $V_{DR}$ is enabled, the transistor P1 is turned on for providing a driving current $I_2$ to the light source 520. The driving current $I_2$ is approximately equal to the voltage value of the system voltage Vcc minus the voltage value of the predetermined voltage Vpre and then divided by the resistance value of the resistor R1, i.e. $I_2$= (Vcc−Vpre)/R1. When the driving voltage $V_{DR}$ is disabled, a positive voltage difference is presented between the positive input terminal and the negative input terminal (i.e., the voltage at the positive terminal is higher than the voltage at the negative input terminal). Therefore, the output terminal of the OP-AMP 211 outputs a high voltage level (e.g., the system voltage Vcc), so that the transistor P1 is turned off, thus the driving current $I_2$ is turned off.

Fifth Embodiment

Figure 6:
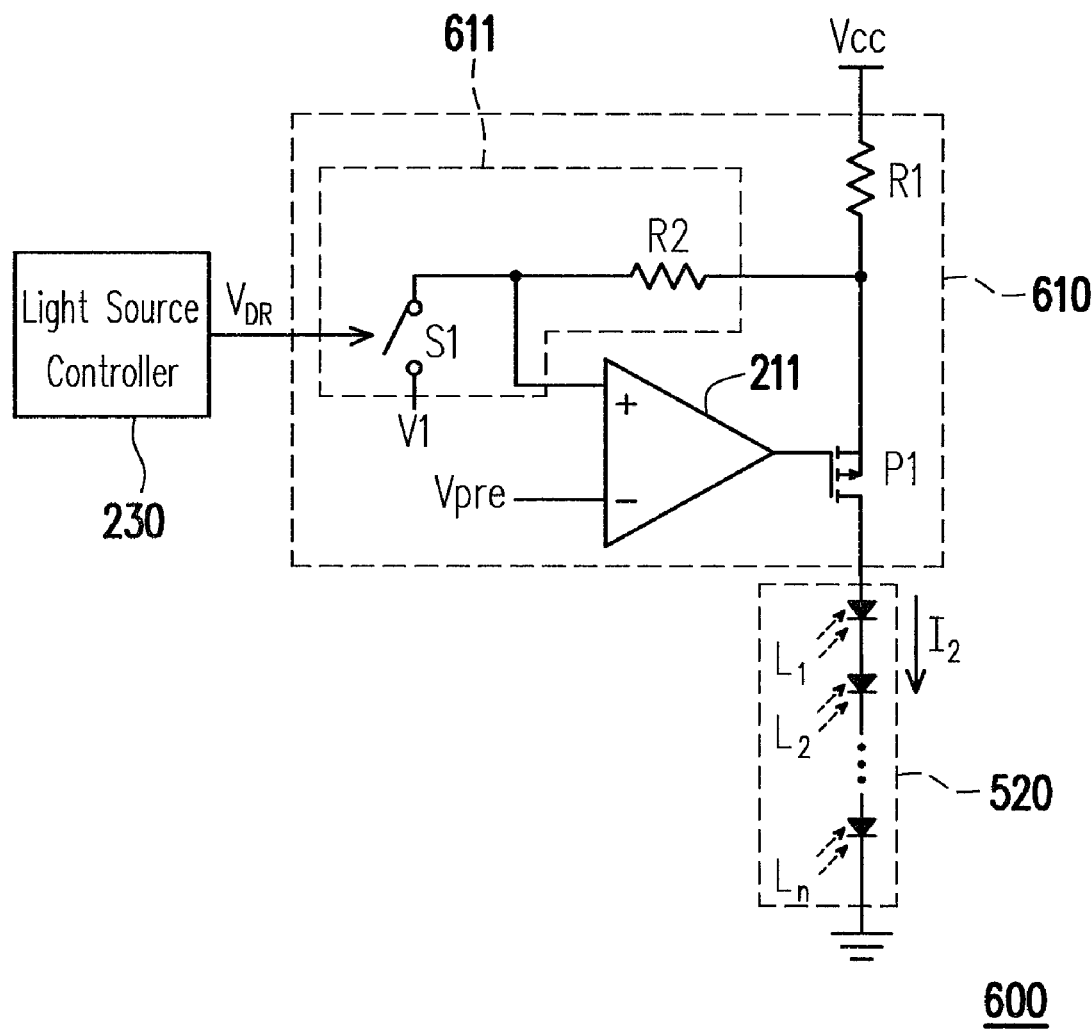
FIG. 6 is a schematic diagram illustrating a circuit of a light source apparatus according to a fifth embodiment of the present invention.

FIG. 6 is a schematic diagram illustrating a circuit of a light source apparatus 600 according to a fifth embodiment of the present invention. Comparing FIG. 6 with FIG. 5, it can be learnt that the main difference between FIG. 5 and FIG. 6 is the switch unit 611 of the driving circuit 610. In the switch unit 611, a second resistor R2 is employed for substituting the switch S2. The switch unit 611 is operated in a manner similar to the switch unit 311 of the embodiment of FIG. 3, and is not to be iterated hereby. When the driving voltage $V_{DR}$ is enabled, the transistor P1 is turned on for providing the driving current $I_2$ to the light source 520. The driving current $I_2$ is approximately equal to the voltage value of the system voltage Vcc minus the voltage value of the predetermined voltage Vpre and then divided by the resistance value of the resistor R1. When the driving voltage $V_{DR}$ is disabled, a positive voltage difference is presented between the positive input terminal and the negative input terminal. Therefore, the output terminal of the OP-AMP 211 outputs a high voltage level, so that the transistor P1 is turned off, thus the driving current $I_2$ is turned off.

Sixth Embodiment

Figure 7:
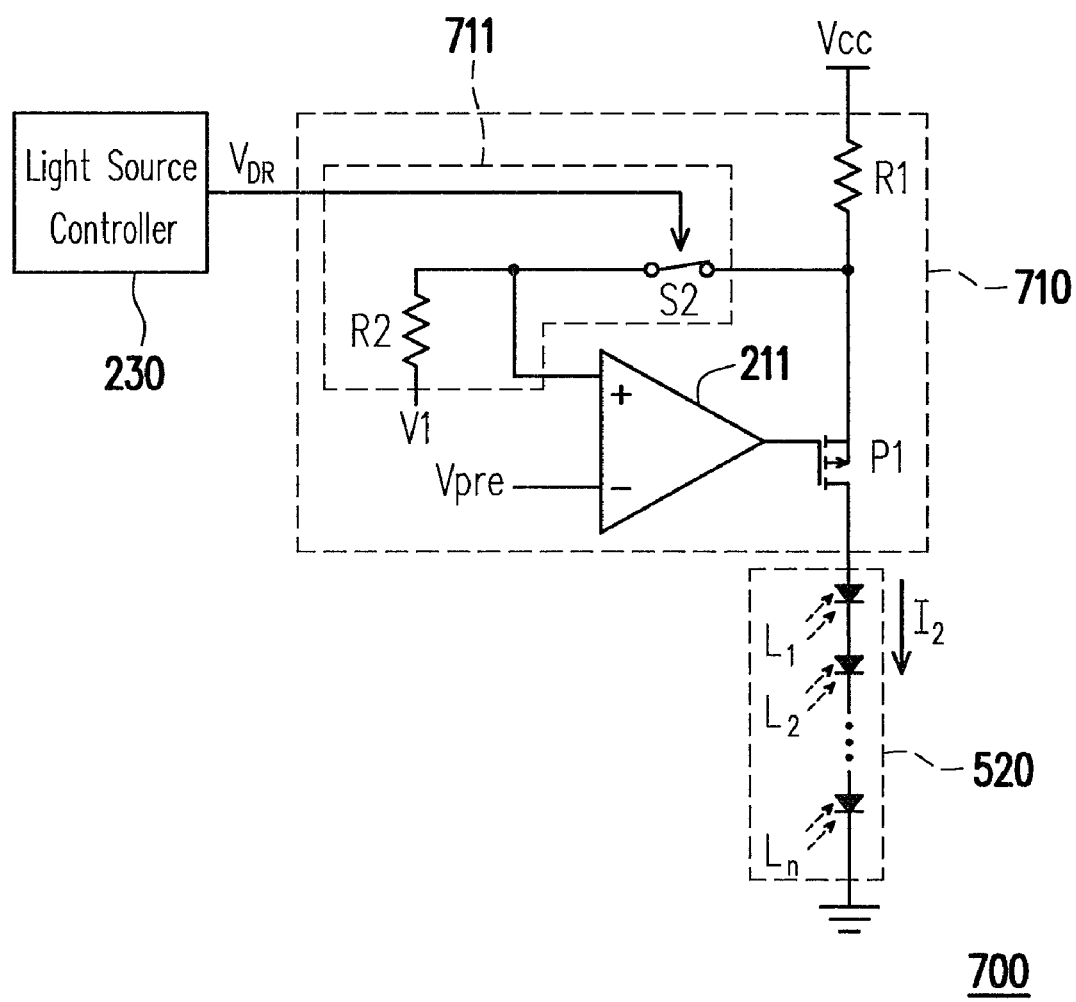
FIG. 7 is a schematic diagram illustrating a circuit of a light source apparatus according to a sixth embodiment of the present invention.

FIG. 7 is a schematic diagram illustrating a circuit of a light source apparatus 700 according to a sixth embodiment of the present invention. Comparing FIG. 7 with FIG. 5, it can be learnt that the main difference between FIG. 5 and FIG. 7 is the switch unit 711 of the driving circuit 710. In the switch unit 711, a second resistor R2 is employed for substituting the switch S1. The switch unit 711 is operated in a manner similar to the switch unit 411 of the embodiment of FIG. 4, and is not to be iterated hereby. When the driving voltage $V_{DR}$ is enabled, the transistor P1 is turned on for providing the driving current $I_2$ to the light source 520. The driving current $I_2$ is approximately equal to the voltage value of the system voltage Vcc minus the voltage value of the predetermined voltage Vpre and then divided by the resistance value of the resistor R1. When the driving voltage $V_{DR}$ is disabled, a positive voltage difference is presented between the positive input terminal and the negative input terminal. Therefore, the output terminal of the OP-AMP 211 outputs a high voltage level, so that the transistor P1 is turned off, thus the driving current $I_2$ is turned off.

It should be noted that the transistor N1 of the first embodiment, the second embodiment and the third embodiment of the present invention can be substituted by an NPN junction transistor including a base terminal, a collector terminal, and an emitter terminal. When such an NPN junction transistor is employed for substituting the transistor N1, the base terminal is coupled to the output terminal of the OP-AMP 211, the collector terminal is coupled to the light source 220, and the emitter terminal is coupled to the first resistor R1 and the switch unit. In such a way, the circuit operation of the first embodiment, the second embodiment, and the third embodiment of the present invention can also be realized. Likewise, the transistor P1 of the fourth embodiment, the fifth embodiment and the sixth embodiment of the present invention can be substituted by a PNP junction transistor including a base terminal, a collector terminal, and an emitter terminal. When such a PNP junction transistor is employed for substituting the transistor P1, the base terminal is coupled to the output terminal of the OP-AMP 211, the collector terminal is coupled to the light source 520, and the emitter terminal is coupled to the first resistor R1 and the switch unit. In such a way, the circuit operation of the fourth embodiment, the fifth embodiment and the sixth embodiment of the present invention can also be realized.

In summary, according to the foregoing embodiments of the present invention, the light source apparatus and the driving circuit thereof employs switch unit to switch voltages between different signal terminals according to a variation of the driving voltage. In such a way, the circuit operation function of the OP-AMP can be switched between a comparator and a voltage follower. Further, when the OP-AMP serves as a comparator, the voltage outputted therefrom turns off the transistor, and when the OP-AMP serves a voltage follower, the voltage outputted therefrom turns on the transistor for driving the light source. As such, the variation amplitude of the operation current of the inside chip can be reduced. Meanwhile, because of the stable electric characteristic of the OP-AMP, the driving current of the light source increases and decreases with a same speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source driving circuit, comprising:
   an operation amplifier, comprising a first input terminal, a second input terminal and an output terminal, wherein the first input terminal couples to a predetermined voltage;
   a transistor, comprising a first terminal, a second terminal and a control terminal, wherein the first terminal couples to a light source, and the control terminal is directly connected to the output terminal of the operation amplifier;
   a switch unit, comprising a first signal terminal receiving a first voltage which is constant and is greater than the predetermined voltage, a second signal terminal coupled to the second input terminal of the operation amplifier, a third signal terminal coupled to the second terminal of the transistor, and an enabling terminal receiving a driving voltage, wherein the switch unit transmits a voltage of the third signal terminal to the second signal terminal when the driving voltage is enabled so that the operation amplifier is operated as a voltage follower to turn on the transistor, and the switch unit transmits a voltage of the first signal terminal to the second signal terminal when the driving voltage is disabled so that the operation amplifier is operated as an open loop voltage comparator and outputs a negative saturation voltage to directly turn off the transistor; and
   a first resistor, coupled between the second terminal of the transistor and a second voltage.

2. The light source driving circuit according to claim 1, wherein the switch unit comprises:
   a first switch, comprising a first terminal receiving the first voltage, and a second terminal coupled to the second input terminal of the operation amplifier, wherein the first switch is turned off when the driving voltage is enabled, and the first switch is turned on when the driving voltage is disabled; and
   a second switch, comprising a first terminal coupled to the second input terminal of the operation amplifier, and a second terminal coupled to the second terminal of the transistor, wherein the second switch is turned on when the driving voltage is enabled, and the second switch is turned off when the driving voltage is disabled.

3. The light source driving circuit according to claim 1, wherein the switch unit comprises:
   a first switch, comprising a first terminal coupled to the first voltage, and a second terminal coupled to the second input terminal of the operation amplifier, wherein the first switch is turned off when the driving voltage is enabled, and the first switch is turned on when the driving voltage is disabled; and
   a second resistor, coupled between the second input terminal of the operation amplifier and the second terminal of the transistor.

4. The light source driving circuit according to claim 1, wherein the switch unit comprises:

a second resistor, coupled between the first voltage and the second input terminal of the operation amplifier; and a second switch, comprising a first terminal coupled to the second input terminal of the operation amplifier, and a second terminal coupled to the second terminal of the transistor, wherein the second switch is turned on when the driving voltage is enabled, and the second switch is turned off when the driving voltage is disabled.

5. The light source driving circuit according to claim 1, wherein the first input terminal and the second input terminal of the operation amplifier are a positive input terminal and a negative input terminal, respectively.

6. The light source driving circuit according to claim 1, wherein the second voltage is a grounding voltage.

7. The light source driving circuit according to claim 6, wherein the transistor is an N-channel metal oxide semiconductor (NMOS) transistor.

8. The light source driving circuit according to claim 7, wherein the first terminal of the transistor is a drain terminal, the second terminal of the transistor is a source terminal, and the control terminal of the transistor is a gate terminal.

9. The light source driving circuit according to claim 6, wherein the transistor is an NPN junction transistor.

10. The light source driving circuit according to claim 9, wherein the first terminal of the transistor is a collector terminal, the second terminal of the transistor is an emitter terminal, and the control terminal is a base terminal.

11. The light source driving circuit according to claim 1, wherein the second voltage is a system voltage.

12. The light source driving circuit according to claim 11, wherein the transistor is a P-channel metal oxide semiconductor (PMOS) transistor.

13. The light source driving circuit according to claim 12, wherein the first terminal of the transistor is a drain terminal, the second terminal of the transistor is a source terminal, and the control terminal is a gate terminal.

14. The light source driving circuit according to claim 11, wherein the transistor is a PNP junction transistor.

15. The light source driving circuit according to claim 14, wherein the first terminal of the transistor is a collector terminal, the second terminal of the transistor is an emitter terminal, and the third terminal of the transistor is a base terminal.

16. The light source driving circuit according to claim 1, wherein the predetermined voltage is a constant voltage.

17. A light source apparatus, comprising:
a light source, comprising a first terminal and a second terminal, wherein the first terminal couples with a third voltage; and
a light source driving circuit, comprising:
an operation amplifier, comprising a first input terminal, a second input terminal and an output terminal, wherein the first input terminal coupled to a predetermined voltage;
a transistor, comprising a first terminal, a second terminal and a control terminal, wherein the first terminal couples to the second terminal of the light source, the control terminal is directly connected to the output terminal of the operation amplifier;
a switch unit, comprising a first signal terminal receiving a first voltage which is constant and is greater than the predetermined voltage, a second signal terminal coupled to the second input terminal of the operation amplifier, a third signal terminal coupled to the second terminal of the transistor, and an enabling terminal receiving a driving voltage, wherein the switch unit transmits a voltage of the third signal terminal to the second signal terminal when the driving voltage is enabled, so that the operation amplifier is operated as a voltage follower, and the switch unit transmits a voltage of the first signal terminal to the second signal terminal when the driving voltage is disabled, so that the operation amplifier is operated as an open loop comparator and outputs a negative saturation voltage to directly turn off the transistor; and
a first resistor, coupled between the second terminal of the transistor and a second voltage.

18. The light source apparatus according to claim 17, wherein the switch unit comprises:
a first switch, comprising a first terminal receiving the first voltage, and a second terminal coupled to the second input terminal of the operation amplifier, wherein the first switch is turned off when the driving voltage is enabled, and the first switch is turned on when the driving voltage is disabled; and
a second switch, comprising a first terminal coupled to the second input terminal of the operation amplifier, and a second terminal coupled to the second terminal of the transistor, wherein the second switch is turned on when the driving voltage is enabled, and the second switch is turned off when the driving voltage is disabled.

19. The light source apparatus according to claim 17, wherein the switch unit comprises:
a first switch, comprising a first terminal coupled to the first voltage, and a second terminal coupled to the second input terminal of the operation amplifier, wherein the first switch is turned off when the driving voltage is enabled, and the first switch is turned on when the driving voltage is disabled; and
a second resistor, coupled between the second input terminal of the operation amplifier and the second terminal of the transistor.

20. The light source apparatus according to claim 17, wherein the switch unit comprises:
a second resistor, coupled between the first voltage and the second input terminal of the operation amplifier; and
a second switch, comprising a first terminal coupled to the second input terminal of the operation amplifier, and a second terminal coupled to the second terminal of the transistor, wherein the second switch is turned on when the driving voltage is enabled, and the second switch is turned off when the driving voltage is disabled.

21. The light source apparatus according to claim 17, wherein the first input terminal and the second input terminal of the operation amplifier are a positive input terminal and a negative input terminal, respectively.

22. The light source apparatus according to claim 17, wherein the second voltage is a grounding voltage.

23. The light source apparatus according to claim 22, wherein the transistor is an NMOS transistor.

24. The light source apparatus according to claim 23, wherein the first terminal of the transistor is a drain terminal, the second terminal of the transistor is a source terminal, and the control terminal of the transistor is a gate terminal.

25. The light source apparatus according to claim 22, wherein the transistor is an NPN junction transistor.

26. The light source apparatus according to claim 25, wherein the first terminal of the transistor is a collector terminal, the second terminal of the transistor is an emitter terminal, and the control terminal is a base terminal.

27. The light source apparatus according to claim 17, wherein the second voltage is a system voltage.

28. The light source apparatus according to claim 27, wherein the transistor is a PMOS transistor.

29. The light source apparatus according to claim 28, wherein the first terminal of the transistor is a drain terminal, the second terminal of the transistor is a source terminal, and the control terminal is a gate terminal.

30. The light source apparatus according to claim 27, wherein the transistor is a PNP junction transistor.

31. The light source apparatus according to claim 30, wherein the first terminal of the transistor is a collector terminal, the second terminal of the transistor is an emitter terminal, and the third terminal of the transistor is a base terminal.

32. The light source apparatus according to claim 17, wherein the light source comprises at least one light emitting diode (LED).

33. The light source apparatus according to claim 17, wherein the predetermined voltage is a constant voltage.

34. The light source apparatus according to claim 17, wherein the third voltage is a grounding voltage or a system voltage.

* * * * *